US005801730A

United States Patent [19]

Shima et al.

[11] Patent Number: 5,801,730

[45] Date of Patent: Sep. 1, 1998

[54] INK JET PRINT HEAD HAVING A PROJECTING EJECTION ELECTRODE

[75] Inventors: Kazuo Shima; Junichi Suetsugu; Ryosuke Uematsu; Hitoshi Minemoto; Yoshihiro Hagiwara, all of Tokyo, Japan

[73] Assignee: NEC Corporation, Japan

[21] Appl. No.: 763,838

[22] Filed: Dec. 12, 1996

[30] Foreign Application Priority Data

Dec. 14, 1995 [JP] Japan .................................... 7-325321

[51] Int. Cl.$^{6}$ .................................................... G01D 15/16

[52] U.S. Cl. ................................................................ 347/55

[58] Field of Search .......................................... 347/55, 47

[56] References Cited

U.S. PATENT DOCUMENTS

| | | | |
|---|---|---|---|
| 3,662,399 | 5/1972 | Yanou et al. | 347/47 X |
| 3,886,565 | 5/1975 | Kojima | 347/55 X |
| 4,206,467 | 6/1980 | Fujii | 347/55 |
| 4,333,086 | 6/1982 | Ebi | 347/55 X |
| 4,575,737 | 3/1986 | Vermot-Gaud et al. | 347/55 X |
| 4,806,956 | 2/1989 | Nishikawa et al. | 347/55 |

FOREIGN PATENT DOCUMENTS

| | | | |
|---|---|---|---|
| 0363325 A1 | 4/1990 | European Pat. Off. | 347/55 |
| 778135 | 6/1997 | European Pat. Off. | |
| 3004143 A1 | 8/1980 | Germany | 347/47 |
| 93-11866 | 6/1993 | WIPO | |

OTHER PUBLICATIONS

Chen et al.; "Ink Jet Emitter"; Feb. 1972; IBM Technical Disclosure Bulletin; vol. 14, No. 9; p. 2797.

*Primary Examiner*—S. Lee
*Attorney, Agent, or Firm*—Ostrolenk, Faber, Gerb & Soffen, LLP

[57] ABSTRACT

An ink jet print head using an electrostatic field and being capable of printing characters and letters with a high precision includes an ink chamber for keeping therein ink including charged toner particles, an ejection opening for establishing connection between the ink chamber and an external space, an ejection electrode arranged to be slightly projected from the ejection opening, a cataphoresis electrode disposed on a side opposing to the ejection opening of the ink chamber, an opposing electrode arranged to oppose the ejection electrode with a recording media therebetween, a cataphoresis voltage source for applying a predetermined voltage to the cataphoresis electrode, and an ejection voltage source for applying a predetermined pulse voltage to the ejection electrode. The ejection electrode is coated with a hydropholic insulating resin.

7 Claims, 5 Drawing Sheets

INK JET PRINT HEAD HAVING A PROJECTING EJECTION ELECTRODE

BACKGROUND OF THE INVENTION

The present invention relates to an ink jet print head, and in particular, to an ink jet print head employing ink including an insulating solvent in which charged pigment particles such as toner particles are diffused such that the pigment particles are ejected from the ink through an interaction between the particles and an electric field to achieve a printing operation.

DESCRIPTION OF THE RELATED ART

According to conventional technology, ink jet print head using an electric field in which a charged liquid ink is ejected therefrom by an interaction between the ink and the electric field.

However, with a drawback to conventional ink jet print heads is that the liquid ink fixed onto a recording media causes blurs and mottles which lowers the print quality of the printed characters and letters. Moreover, there exists a disadvantage that the ink fixed onto the media is dissolved when the ink becomes wet with water.

SUMMARY OF THE INVENTION

It is therefore an object of the present invention to provide an ink jet print head, particularly, an ink jet print head using an electrostatic field capable of achieving a high-quality printing operation with a satisfactory precision, thereby solving the problems of the conventional technology.

In accordance with a first aspect of the present invention, to achieve the object above, there is provided an ink jet print head including an ink chamber for keeping therein ink including charged toner particles, an ejection opening for establishing connection between the ink chamber and an external space, an ejection electrode arranged to be slightly projected from the ejection opening, a cataphoresis electrode disposed on a side opposing to the ejection opening of the ink chamber, an opposing electrode arranged to oppose the ejection electrode with a recording media therebetween, a cataphoresis voltage source for applying a predetermined voltage to the cataphoresis electrode, and an ejection voltage source for applying a predetermined pulse voltage to the ejection electrode. The ejection electrode is coated with a hydropholic insulating resin.

In accordance with the present invention, when a voltage having a polarity identical to the polarity of toner particles is applied to the cataphoresis electrode, the toner particles moves through the ink due to electrophoresis to be concentrated onto the ejection opening. These charged particles form an ink meniscus having a projected shape near the tip end of the ejection electrode. When a predetermined voltage pulse having a polarity equal to the polarity of the toner particles is applied to the ejection electrode, the toner particles are ejected at once from the tip end of the ejection electrode to the opposing electrode. The ejected toner particles are fixed onto the recording media to achieve a dot recording operation. For the toner particles lost from the ejection opening due to the toner particle ejection, there are supplied toner particles by the potential difference between the cataphoresis electrode and the ejection electrode. In the configuration, since the surface of the ejection electrode is coated with a hydropholic resin, the surface tension acts upon the tip end portion of the ejection electrode to thereby keep the ink meniscus formed in the projected shape along the tip end portion.

In accordance with a second aspect of the present invention, the ejection electrode coated with the insulating resin includes a tip end portion manufactured in a smooth spherical contour.

Since the tip end of the ejection electrode has a smooth spherical contour in accordance with the present invention, there can be minimized the change in the ink meniscus covering the tip end portion of the ejection electrode. Moreover, at the vertex of the meniscus having the projected shape, the direction of lines of electric force is vertical and nearest to the opposing electrode.

In accordance with a third aspect of the present invention, the ejection electrode coated with the insulating resin includes a tip end portion projecting from the ejection opening about 80 μm to about 100 μm.

Since tip end of the ejection electrode is projected from the ejection opening about 80 μm to about 100 μm in accordance with the present invention, the ink meniscus is formed in a projected contour near the tip end of the ejection electrode onto which the electric field is concentrated. As a result, the objects above are achieved.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
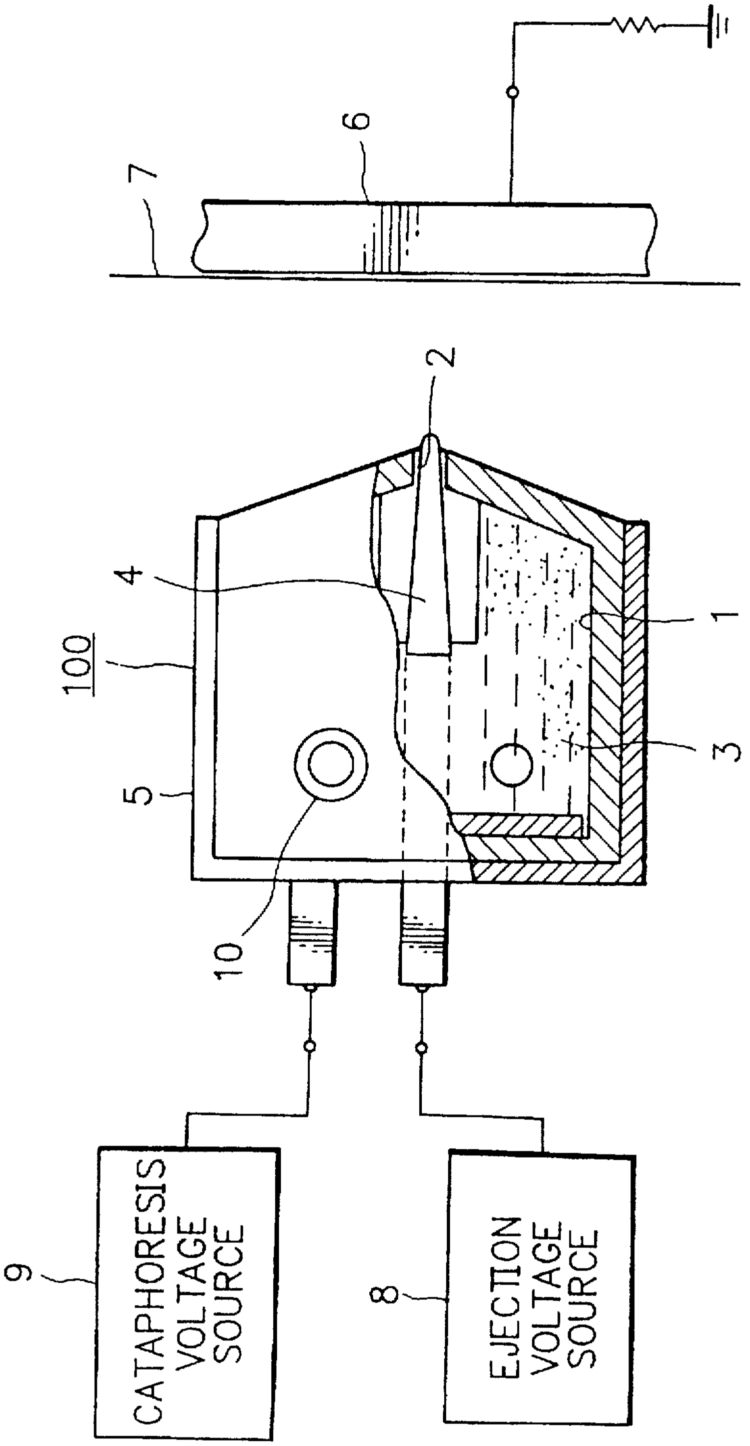
FIG. 1 is a partially cutaway front view showing an embodiment of the ink jet print head in accordance with the present invention.
Figure 2:
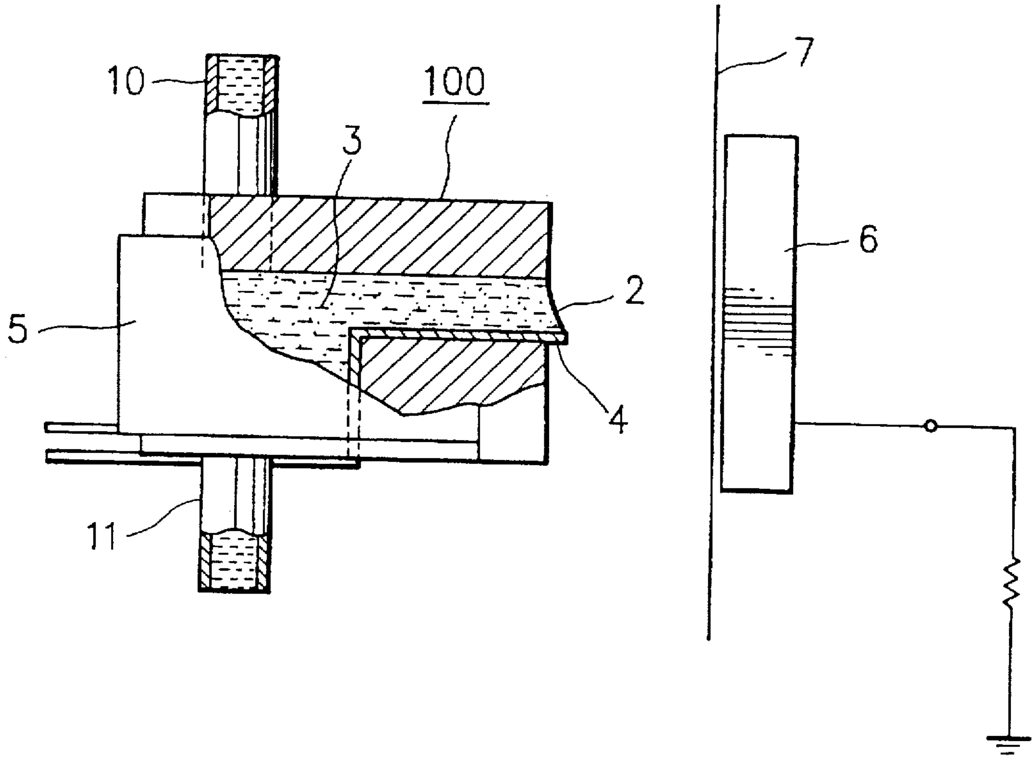
FIG. 2 is a partially cutaway bottom end view of the embodiment of FIG. 1.
Figure 3:
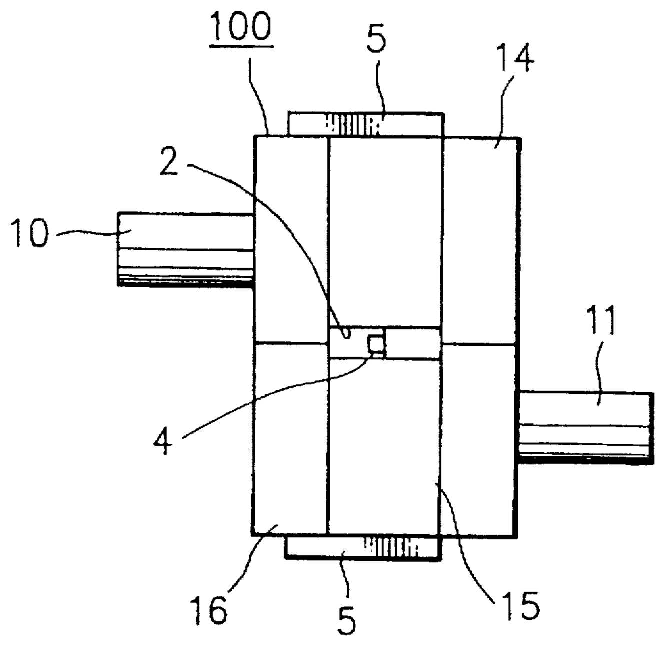
FIG. 3 a partial right side view of the embodiment of FIG. 1.
Figure 4:
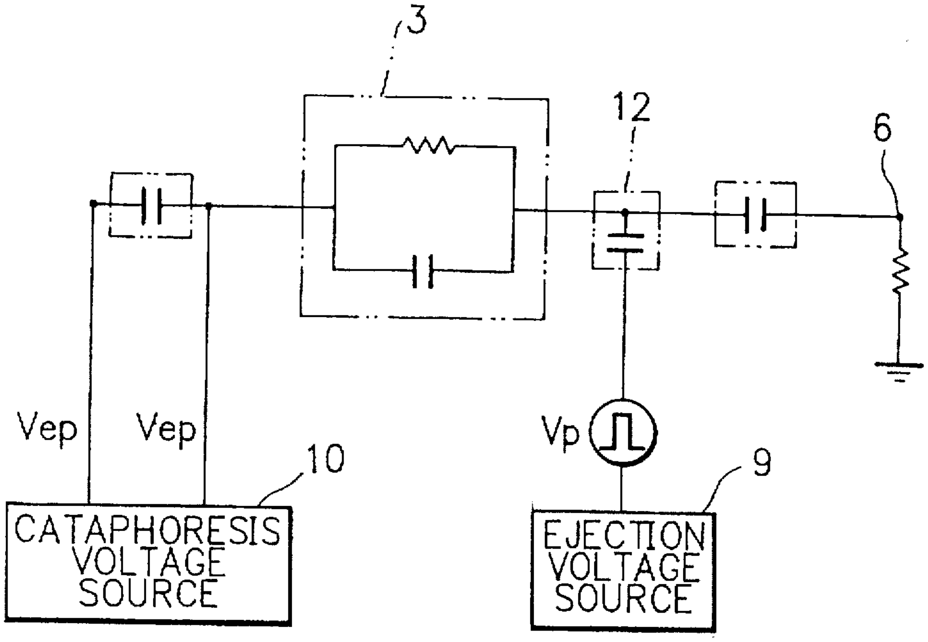
FIG. 4 is a circuit diagram showing an equivalent circuit of the embodiment of FIG. 1.
Figure 5:
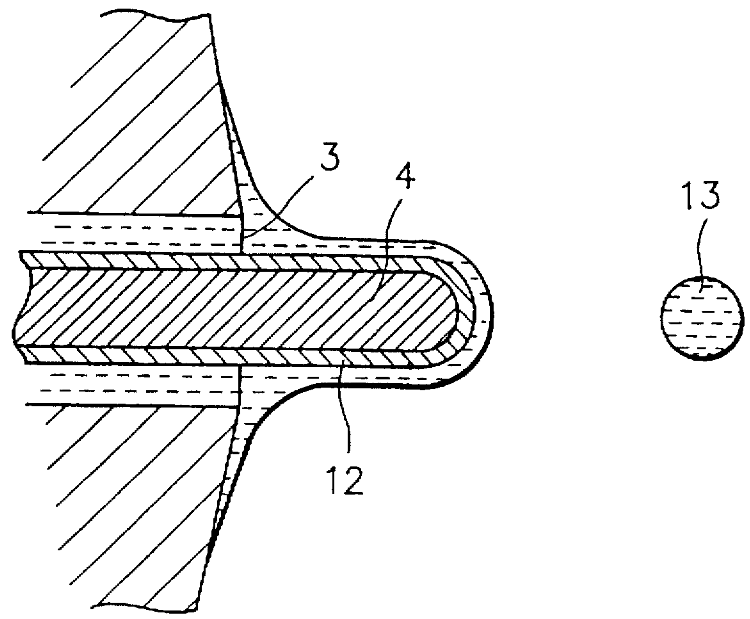
FIG. 5 is a diagram showing a magnified view of a tip end portion of an ejection electrode used in the embodiment of FIG. 1.

First, the ink jet print head shown in FIGS. 1 to 3 includes an ink chamber 1 for keeping therein ink 3 including charged toner particles, an ejection opening 2 establishing connection between the ink chamber 1 and an external space. An ejection electrode 4 is provided projecting slightly into the external space from the ejection opening 2, a cataphoresis electrode 5 is arranged on a side opposite to the ejection opening 2 of the ink chamber 1, and an opposing electrode 6 is disposed to oppose the ejection electrode 4 with a recording media 7 therebetween. A cataphoresis voltage source 9 is provided for supplying a predetermined voltage Vep to the cataphoresis electrode 5, and an ejection voltage source 8 is provided for applying a predetermined pulse voltage Vp to the ejection electrode 4. In the constituent elements, the ejection electrode 4 is coated with an insulative resin 12 having a hydrophylic characteristic as shown in FIG. 5.

More specifically, the ink chamber 1 of the embodiment is enclosed with a lower plate 14, a side wall 15, and an upper plate 16 which are made of a dielectric material.

The ejection opening 2 is a small gap disposed in an end portion of the side wall 15 to form an ink meniscus. The size of gap or gap width is set to a slit width to develop a capillary action.

The ink 3 is liquid ink including a solvent called a carrier (e.g., isoparaffin as a petroleum organic solvent such as isoparaffin) in which pigment particles (e.g., toner particles) virtually having charge due to zeta potential. The ink 3 in the ink chamber 1 is applied with a pressure through an ink supply hole 10 and an ink discharge hole 11 by a pump, now shown, to be continuously and forcibly circulated therethrough. In the constitution, the ink supply hole 10 and ink discharge hole 11 are connected to each other via an ink tank and a tube, not shown.

The ejection electrode 4 includes an electrically cast component of such a conductive material having a width of about 50 micrometers (μm) as copper, nickel, or the like. The electrode 4 includes a portion to be brought into contact with the ink 3 as above, the portion being covered with an insulating resin 12. That is, the ejection electrode 4 is insulated from the ink 3. In the configuration, the isulating resin 12 is made of a hydropholic material to increase affinity between a surface of the ejection electrode 4 and the ink 3. The electrode 4 coated with the insulative resin 12 includes a tip end portion having a spherical smooth surface. Moreover, the tip end of the electrode 4 is projected from the ejection opening 2 about 80 μm to about 100 μm.

The cataphoresis electrode 5 is fabricated to enclose the ink chamber 1 on three sides thereof other than the side on which the ejection opening 2 is provided. The electrode 5 includes a portion arranged in the ink chamber 1 to be electrically brought into contact with the ink 3. The electrode 5 is made of a conductive substance such as a metal.

On the other hand, the opposing electrode 6 is fabricated with a conductive material including metals. The electrode 6 is grounded via a predetermined resistance to effectively prevent a disadvantageous event of a large current such as a large leakage current between the opposing electrode 6 and the cataphoresis electrode 5. Additionally, the opposing electrode 6 conducts a function as a platen for the recording media 7.

The ejection voltage source 8 applies a high-voltage pulse Vp having a polarity equal to the polarity of the toner particles in the ink to the ejection electrode 4 at predetermined timing in association with a record signal received from an external device. On the other hand, the cataphoresis voltage source 10 supplies the cataphoresis electrode 5 with a fixed high voltage Vep having a polarity identical to the polarity of the toner particles in the ink 3.

Referring next to the equivalent circuit of the embodiment shown in FIG. 2, the overall operation of the apparatus will be described.

As above, charged toner particles are diffused in the ink 3 of the ink chamber 1. Therefore, the ink 3 is equivalent to a conductor having a predetermined resistance value. Furthermore, the insulative resin 12 disposed on the ejection electrode 4 to insulate the electrode 4 from the ink 3 is equivalent to a capacitor having a predetermined dielectric constant.

First, in a state awaiting a recording operation, the electrophoresis voltage Vep is applied from the cataphoresis voltage source 9 to the cataphoresis electrode 5 brought into contact with the ink 3. In this situation, the ejection electrode 4 is not supplied with the voltage from the ejection voltage source 8 or is supplied with a bias voltage lower than the cataphoresis voltage Vep, causing a potential difference between the cataphoresis electrode 5 and the ejection electrode 4. Thanks to the potential difference, the toner particles virtually functions as electrically charged particles. Namely, on the surface of the insulating resin 12 on the ejection electrode 4, there are collected as many toner particles as the potential of the ink 3 becomes equal to the cataphoresis voltage Vep.

On the other hand, in the recording operation, the ejection voltage Vp is applied as a fixed pulse voltage to the ink 3 on the ejection electrode 4 at a potential equal to the cataphoresis voltage Vep. Resultantly, when the potential difference between the ejection electrode 4 and the opposing electrode 6 exceeds an ejection threshold voltage, Coulomb force applied due to the electrostatic force to the ink 3 including the toner particles on the ejection electrode 4 becomes stronger than the surface tension. Consequently, ink drops 13 are ejected toward the opposing electrode 6. The ink drops 13 thus emitted fix onto the recording media 7 arranged between the ejection opening 2 and the opposing electrode 6, thereby achieving a dot printing operation.

After the recording operation, furthermore, toner particles gathered on the surface of the insulating resin 12 on the ejection electrode 4 to compensate for the charge lost due to the ejection of the toner particles. In this method, since only the toners in the ink 3 are utilized for the recording operation, the density of toners in the ink is lowered in the neighborhood of the ejection electrode 4 immediately after the toner particle ejection. However, since the cataphoresis electrode 5 is applied with a high voltage, the toner particles moves due to electrophoresis from the cataphoresis electrode 5 to the ejection electrode 4 in the ink chamber 1 so that only the toner particles are appropriately supplied to the proximity of the ejection electrode 4. Particularly, since the ejection electrode 4 is insulated from the ink 3, when the charged toner particles move due to electrophoresis through the ink 3 to form a balanced state of the potential distribution in the ink chamber 1, the movement of toner particles is terminated and the initial state is again established.

Thereafter, the high-voltage pulse applied to the ejection electrode 4 is controlled according to the recording image to repeatedly accomplish the recording operation to thereby record a desired image on the recording media 7. The media 7 with the image thereon is then transported to a fixing section, not shown, so that the image is thermally fixed on the media 7.

As described above, according to the principle of ink jet printing, the charged toner particles are extracted from the tip portion having a projected contour of the ink meniscus to the opposing electrode 6 due to the high electric field generated in the proximity of the ejection electrode 4 such that only the extracted toner particles are ejected to achieve the recording operation. In this printing method, since only the toner particles are mainly applied onto the recording media 7, the blur of ink and the like which are drawbacks of the conventional ink jet printing in which liquid ink is directly ejected onto the recording media can be prevented. This advantageously makes it possible to carry out the print operation with a high quality as high as that of the electrophotography.

Figure 6A:
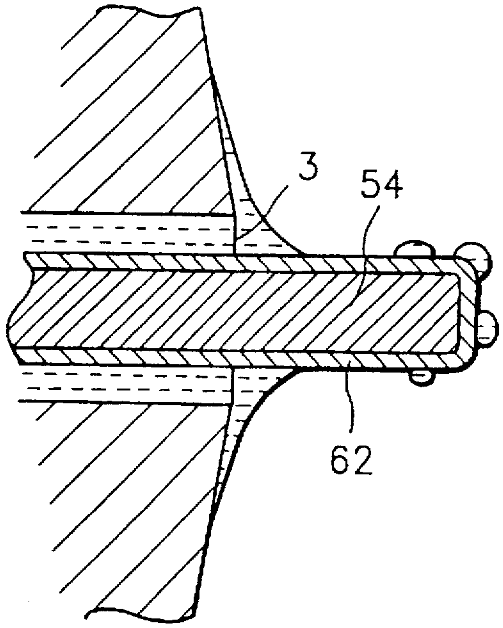
FIG. 6A is a diagram showing a magnified view of the tip end of the ejection electrode using a water-repellent insulating resin.
Figure 6B:
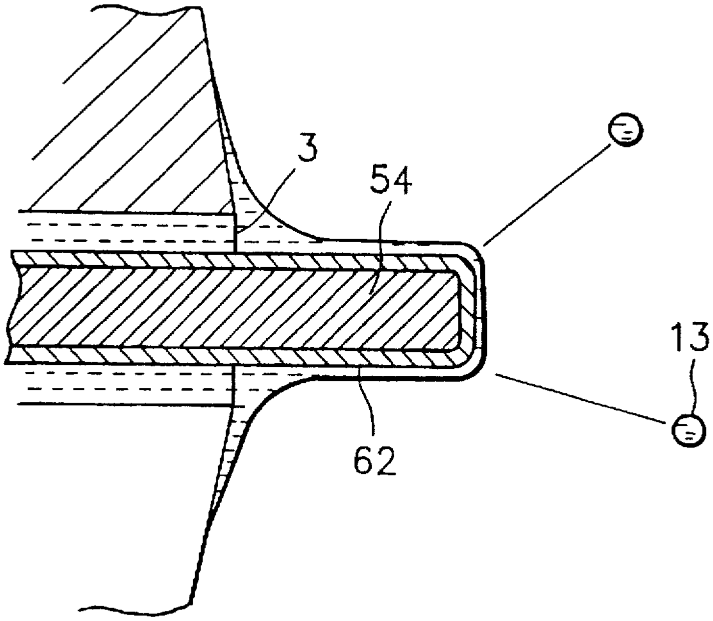
FIG. 6B is a a diagram showing a magnified view of the tip end of the ejection electrode configured in a rectangle contour.

Subsequently, FIGS. 6A and 6B show examples to be compared with the embodiment of the present invention, specifically, the tip end portion of the ejection electrode. In these diagrams, an ejection electrode 54 includes a tip end portion having a flat surface coated with a water-repellent insulative resin 62. In this structure, since the ink is applied with the pressure as described above in the ink chamber, the ink meniscus cannot keep the projected contour covering the tip end of the ejection electrode 54 as can be seen from FIG. 6A. This leads to a disadvantage that the ink 3 cannot be sufficiently supplied to the tip end portion of the ejection electrode 54 onto which the electric field is concentrated.

In addition, the ejection of ink drops 13 occurs beginning at a place in which the electric field is concentrated, namely, at a position at which the change in curvature takes the largest value in the meniscus and which is nearest to the opposing electrode 6. In the examples shown in FIGS. 6A and 6B, the change in the curvature of meniscus of the ink 3 takes the largest value in both corners of the tip end of the ejection electrode 54. Therefore, as can be seen from FIG. 6B, the ejection of ink drops 13 takes place beginning at the corners of the ejection electrode 54. In consequence, there may occur a disadvantageous event that the ejection point cannot be fixed with a satisfactory stability only by a slight change in the state of the surface of meniscus. Additionally, at the corners of the ejection electrode 54, the direction of line of electric force is not perpendicular to the opposing electrode 6, leading to a drawback that the ink drops 13 cannot be ejected with a sufficient stableness.

In association with the disadvantages, since the surface of the ejection electrode 4 is coated with a hydrophilic insulating resin 12 in the embodiment, the projected ink meniscus can be continuously kept retained along the tip end portion of the ejection electrode 4 in relation to the surface tension of the ink 3. This consequently leads to a stable ink ejection.

Moreover, in accordance with the embodiment, since the tip end of the ejection electrode 4 is manufactured in a spherical shape, it is possible to minimize the change in the curvature of ink meniscus covering the tip end of the ejection electrode 4. Furthermore, at the vertex of the projected portion, the direction of the line of electric force is vertical and nearest to the opposing electrode 6. Consequently, the ink drops 13 can be ejected with a more stable state.

Particularly, as can be seen from FIG. 3, since the ejection electrode 4 is provided such that the tip end portion thereof is projected from the ejection opening 2 about 80 μm to about 100 μm in the embodiment, the ink meniscus is created in a projected contour at the tip end of the ejection electrode 4 onto which the electric field is concentrated. Resultantly, the electric field can be concentrated to be sufficient for the toner particle ejection, which advantageously guarantees the stable ink ejection.

In accordance with the configuration and function of the present invention, using the strong electric filed generated in the proximity of the ejection electrode, charged toner particles are attracted from the tip end portion having a projected contour of the ink meniscus to the side of the opposing electrode, there can be prevented the blur and the like of ink disadvantageously taking place in the conventional ink jet printing operation in which liquid ink is directly ejected onto the recording media. This makes it possible to achieve the print operation of characters and letters with as high a print quality as the electrophotography. Additionally, since the surface of the ejection electrode is coated with a hydropholic insulating resin, the ink meniscus having a projected contour can be continuously kept generated along the tip end portion of the ejection electrode, thereby conducting a stable ink ejection.

Furthermore, in accordance with the second aspect of the present invention, since the tip end portion of the ejection electrode is manufactured in a smooth spherical shape, there is reduced the change in the curvature of ink meniscus covering the tip end of the ejection electrode. Moreover, since the direction of lines of electric force at the vertex of the projected portion is vertical and nearest to the opposing electrode, the ink drops can be ejected in a stable state.

Particularly, in accordance with the third aspect of the present invention, since the ejection electrode is constructed such that the tip end portion thereof is projected from the ejection opening about 80μ to about 100 μm, there can be provided a novel ink jet print head in which the ink meniscus has a projected contour in the tip end portion of the ejection electrode onto which the electric field is concentrated, the electric field can be concentrated sufficiently for the ink ejection, thereby achieving a stable ink ejection.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An ink jet print head, comprising:
   - an ink chamber for containing ink including charged toner particles:
   - an ejection opening establishing a connection between the ink chamber and an external space;
   - an ejection electrode slightly projecting from the ejection opening and coated with a hydrophobic insulating resin;
   - a cataphoresis electrode disposed on a side opposite the ejection opening of the ink chamber;
   - an opposing electrode opposite the ejection electrode with a recording media capable of being disposed therebetween;
   - a cataphoresis voltage source for applying a predetermined voltage to the cataphoresis electrode; and
   - an ejection voltage source for applying a predetermined pulse voltage to the ejection electrode.

2. An ink jet print head in accordance with claim 1, wherein the ejection electrode coated with the insulating resin includes a tip end portion of a smooth spherical contour.

3. An ink jet print head in accordance with claim 1, wherein the ejection electrode coated with the insulating resin includes a tip end portion projecting from the ejection opening about 80 μm to about 100 μm.

4. An ink jet print head in accordance with claim 2, wherein the ejection electrode coated with the insulating resin includes a tip end portion projecting from the ejection opening about 80 μm to about 100 μm.

5. An ink jet print head, comprising:
   - an ink chamber for containing ink including charged toner particles:
   - an ejection opening establishing a connection between the ink chamber and an external space;
   - an ejection electrode slightly projecting from the ejection opening;
   - a cataphoresis electrode disposed on a side of the ink chamber;
   - an opposing electrode opposite the ejection electrode with a recording media capable of being disposed therebetween;

a cataphoresis voltage source for applying a predetermined voltage to the cataphoresis electrode; and an ejection voltage source for applying a predetermined pulse voltage to the ejection electrode.

6. An ink jet print head in accordance with claim 5, wherein the ejection electrode is coated with a hydropholic insulating resin.

7. An ink jet print head, comprising:

an ink chamber for containing ink including charged toner particles:

an ejection opening establishing a connection between the ink chamber and an external space;

an ejection electrode which includes a tip end of a smooth spherical contour;

a cataphoresis electrode disposed on a side of the ink chamber;

an opposing electrode opposite the ejection electrode with a recording medial capable of being disposed therebetween;

a cataphoresis voltage source for applying a predetermined voltage to the cataphoresis electrode; and an ejection voltage source for applying a predetermined pulse voltage to the ejection electrode.

* * * * *